United States Patent
Chapman et al.

[15] 3,651,704
[45] Mar. 28, 1972

[54] MOLDED ARTICLE, MOLD AND METHOD OF MANUFACTURE

[72] Inventors: Robert Dean Chapman, Des Plaines; Swick Edwin Grant, Bartlett, both of Ill.

[73] Assignee: Illinois Tool Works Inc., Chicago, Ill.

[22] Filed: May 1, 1970

[21] Appl. No.: 43,658

Related U.S. Application Data

[62] Division of Ser. No. 710,114, Mar. 4, 1968, abandoned.

[52] U.S. Cl.............................................74/230.01, 74/439
[51] Int. Cl....................................F16h 55/36, F16h 55/12
[58] Field of Search.......................................74/230.01, 439

[56] References Cited

UNITED STATES PATENTS

2,924,431  2/1960  Chadbourne....................74/230.01 X
3,006,382  10/1961  Broome..........................74/230.01 X

*Primary Examiner*—Leonard H. Gerin
*Attorney*—Robert W. Beart, Jack R. Halvarsen, Michael Kovac and Barry L. Clark

[57] ABSTRACT

An article of manufacture normally having a secondary member necessary for its function insert molded in place and having warning means which renders the article inoperative when said secondary member is absent. The invention also contemplates the mold and method for fabricating such an article.

4 Claims, 11 Drawing Figures

PATENTED MAR 28 1972 3,651,704
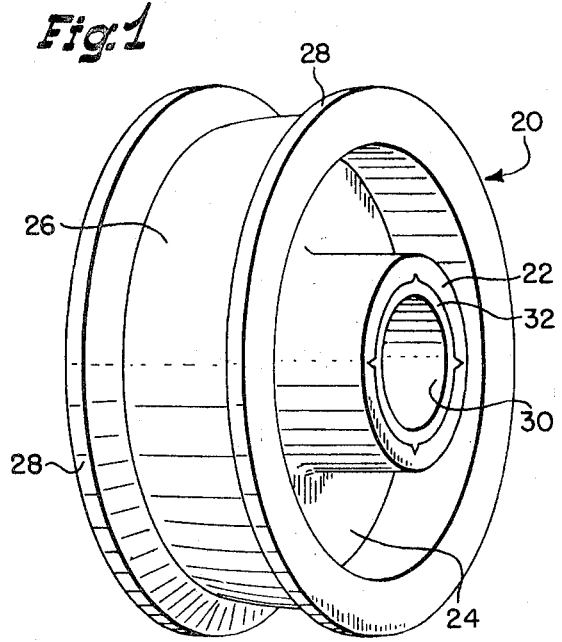
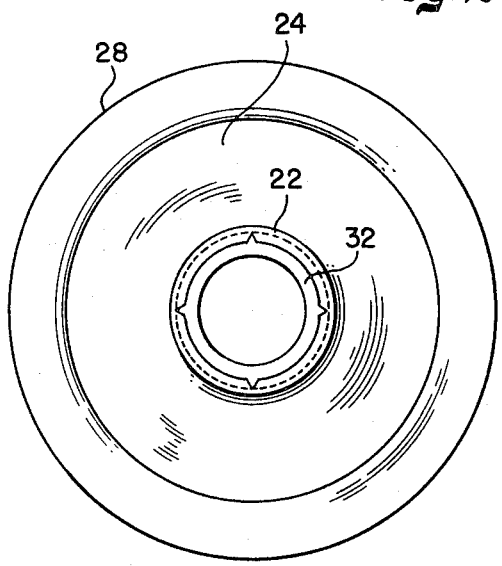
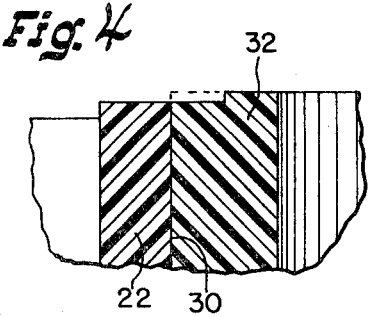
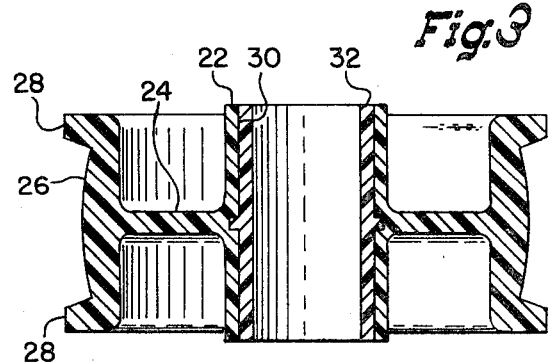
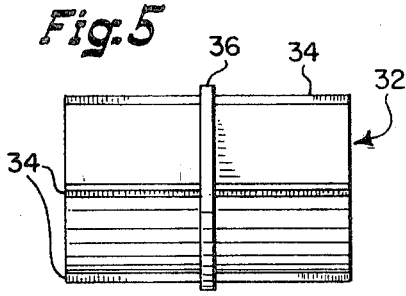
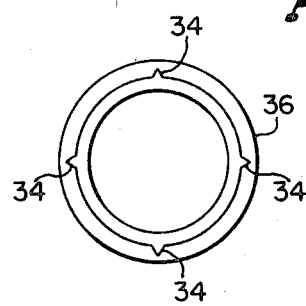
INVENTOR.
Robert D. Chapman
BY Edwin Grant Swick
Their Att'ys

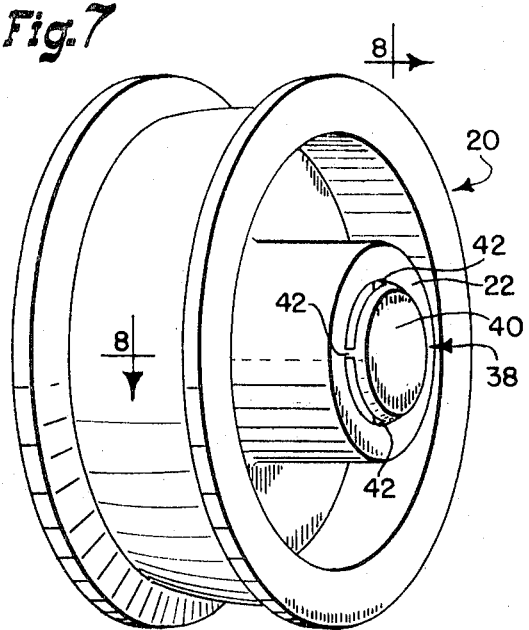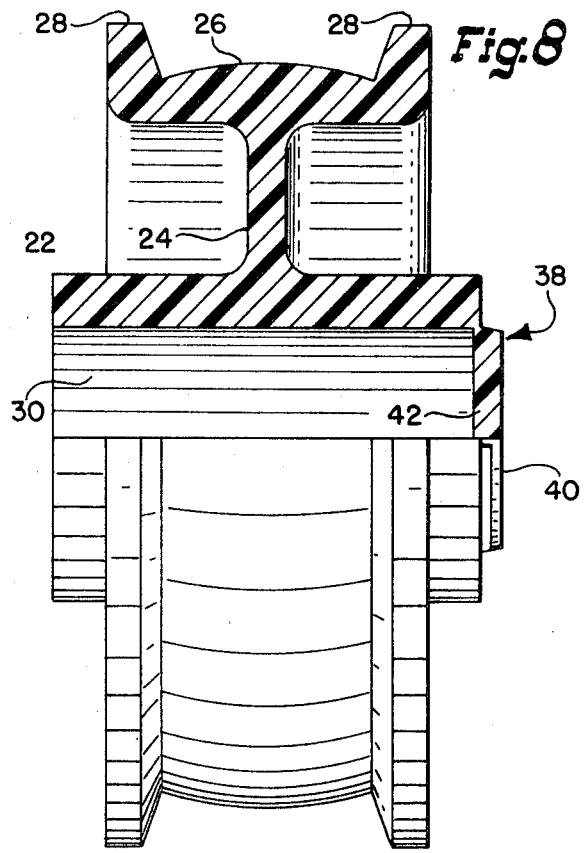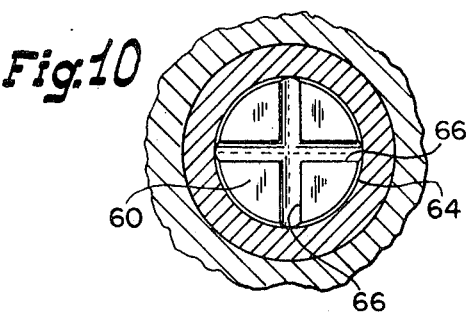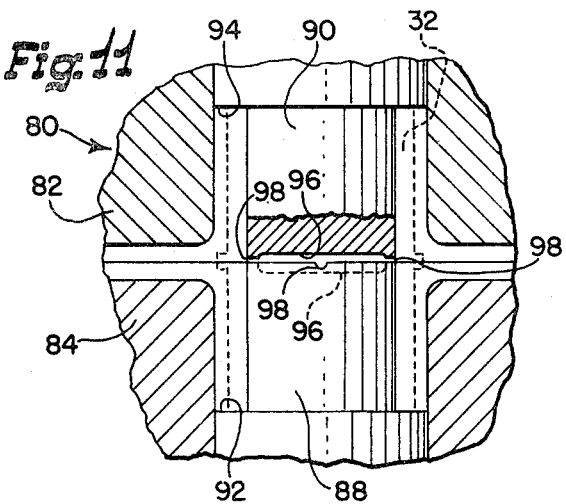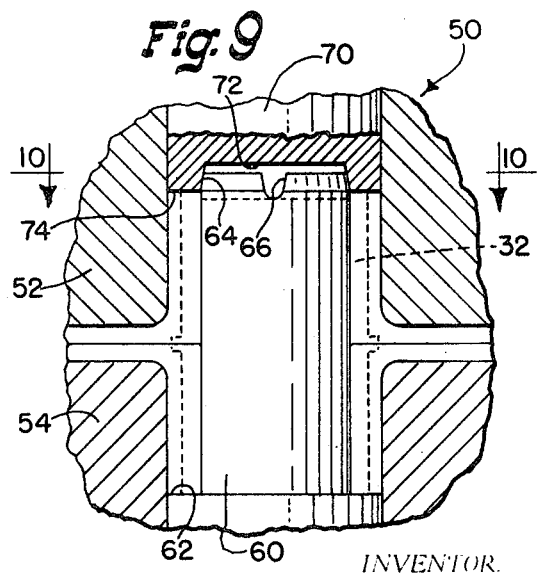

MOLDED ARTICLE, MOLD AND METHOD OF MANUFACTURE

CROSS-REFERENCES OF THE RELATED APPLICATION

This is a division of application, Ser. No. 710,114, filed Mar. 4, 1968, now abandoned.

BACKGROUND OF THE INVENTION

1. Field of the Invention

The invention relates to devices which have a secondary member insert molded therein to provide wear or strength characteristics to use of the total device and to means which automatically are molded into the device to warn the user of the absence of the secondary member and make the incomplete device inoperative.

2. Prior Art

Insert molding of structural strengthening members in rubber and plastic are generally shown in the patents to Voss -- U.S. Pat. No. 2,836,982, and Larsh -- U.S. Pat. No. 3,076,352. The technique of insert molding a bearing means in a wheel-like member, i.e., a pulley, roller or gear, which is of a differing material from the main portion or rim is shown in the patents to Bilde -- U.S. Pat. No. 2,307,874; Caldwell -- U.S. Pat. No. 2,722,130, and Borro et al. -- U.S. 3,241,391.

None of these devices contemplate a warning means adapted to warn the ultimate user of the absence of the secondary means in the final product nor do they utilize such a means for rendering the incomplete product inoperative.

SUMMARY

This invention relates to a molded article of manufacture, a mold for fabricating the article and the method of fabricating such an article. The article has a secondary member insert molded therein and is provided with a warning element integrally molded into the article which renders it inoperative in the absence of the secondary member. For example, a wheel-like article, i.e., a pulley, gear or roller, may require different functional characteristics at its rim than are necessary at its hub. The rim may demand a tough wear resistant characteristic while the hub and its bore need a lubricious quality. By insert molding a sleeve bearing having lubricious qualities in the hub and forming the hub, web and rim of material having structural strength, toughness and wear properties at an economical cost the manufacturer can provide an improved product to his customers. However, if the bearing is absent the article is not satisfactory for the intended purpose and should be discarded. By providing a warning element integrally molded which obstructs the through bore in the absence of an insert bearing the device is rendered inoperative. Additionally, this eliminates total inspection at the manufacturer's plant. An assembler at the customer's plant is unable to mate the defective article with the part to which it is normally assembled and it is discarded, thereby reducing inspection to an absolute minimum at a savings in cost to both the manufacturer and his ultimate customer.

Referring to the Drawings:

FIG. 1 is a perspective view of a pulley wheel embodying the teachings of this invention;

FIG. 2 is an end view of the device shown in FIG. 1;

FIG. 3 is a sectional view in elevation of the device shown in FIGs. 1 and 2;

FIG. 4 is an enlarged view of the hub and an insert bearing;

FIG. 5 is an elevational view of said insert bearing;

FIG. 6 is an end view of said insert bearing;

FIG. 7 is a perspective view of a pulley wheel in which a warning device has been molded indicating the absence of said insert bearing;

FIG. 8 is an elevational view and partial section taken along Lines 8—8 in FIG. 7;

FIG. 9 is an elevational view and partial section of a mold of the type utilized to form pulleys embodied in this invention;

FIG. 10 is an end view of a mold pin as viewed along Line 10—10 of FIG. 9; and

FIG. 11 is an elevational view and partial section of a secondary embodiment of the mold utilized to produce articles embodying this invention.

DESCRIPTION OF THE PREFERRED EMBODIMENTS

An embodiment of the present invention may be a wheel-like device such as pulley 20 having a hub 22 web 24 and a rim 26 with one or more side flanges 28 projecting radially outwardly from the edges of the rim to retain a power transmitting means such as a belt, not shown. In the particular embodiment illustrated the hub 22 is provided with a through bore 30 having a sleeve-type bearing member 32.

The bearing member 32, as best seen in FIGS. 5 and 6, has a cylindrical shape with a plurality of circumferentially spaced axially extending ribs 34 and a radially extending flange 36 spaced intermediate the axial extremity of the bearing 32. The bearing member 32 is preferably injection molded first, inserted within a mold and the pulley wheel 20 injection molded around the bearing. Further details of this method will be set forth hereinafter. The bearing 32 preferably injection molded from Teflon (Tetrafluoroethylene), Nylon or Acetal Resins. Additionally any one of these materials can be filled with one or more of the following: glass, asbestos, mica, or talc. Additionally, the Nylon can be filled with molybdenum disulphide or tetrafluoroethylene. These materials either singly or in combination with one or more of the fillers will provide the lubricious characteristics desired in a bearing. The wheel, on the other hand, requires wear qualities plus the ability to withstand heat generated by its contact with a drive belt. Suitable injection molding materials for the wheel are polypropylene, polyethylene or polystyrene. Again, these materials may be used in their natural state or with the addition of one or more fillers such as glass, asbestos or talc. It will be recognized, by those skilled in the art, that other combinations of materials from the die cast metal field would be equally acceptable for the purposes of the invention.

Since the materials which are utilized for the wheel portion of the pulley are not particularly suitable for use in rotation about a shaft, not shown, it has been found that virtually one hundred percent inspection of the wheel was necessary. To eliminate this inspection and its attendant cost, means were provided to have the user a warning that the bearing 32 was absent and further to render the device inoperative in the absence of the bearing 32. Such a device can be seen in FIGS. 7 and 8. The pulley 20 has its regular hub 22, web 24, rim 26 and the attendant side flanges 28 but lacks the bearing 32. In this embodiment there is located at one end of the through bore 30 a warning means 38 in the form of an obstruction formed by a disk 40 and a plurality of radially extending struts 42 which are integral with the disk and integral with the side wall of the through bore 30. An attempt by the ultimate user to insert a shaft within this pulley is blocked and the user immediately recognizes that this pulley wheel must be discarded since it does not incorporate the bearing member 32.

Referring now to FIGS. 9 and 10 wherein a portion of a mold utilized to form the article of this invention is shown in partial section, the mold 50 includes two plates 52–54 having the configuration of the pulley wheel formed in the faces thereof, only the hub and a portion of the web being shown. Extending outwardly from plate 54 is a core pin 60 which extends into the cavity of late 52 and engages a cavity in core pin 70 located within plate 52. Core pin 60, in the present embodiment, has a diameter substantially equal to the internal diameter of the bearing 32 and at one extremity an annular shoulder 62 substantially equal in diameter to the diameter of hub 22. Core pin 60 at its extremity opposite shoulder 62 is tapered as at 64 and is provided with one or more grooves or runners 66, as best seen in the end view of pin 60 shown in FIG. 10. Core pin 70 is provided, at the end facing core pin 60, with a tapered recess 72 and an annular face 74 equivalent in diameter to annular shoulder 62. The side walls of the tapered recess 72 are complimentary to the tapered end 64 of core pin 60 but have a greater axial dimension than the tapered end 64 with which it mates. It will be noted that the groove 66 projects axially below the lower extremity of tapered end 64, for purposes best set forth hereinafter.

In the fabrication of a pulley of the present design a bearing member 32, already fabricated, is located on core pin 60. The length of bearing 32 is controlled so that it is at least slightly larger than the distance from annular shoulder 62 and annular face 74. Normally, the bearing has a length which is from 0.001 to 0.010 inch in excess of the distance from face 74 to shoulder 62, whereby, when the mold is closed the bearing is placed in compression and an effective seal is obtained between the bearing and the opposed shoulder 62 and annular face 74. Thus, when the material for the wheel is injected into the mold it surrounds the bearing 32 and closely mates with the rib 34 and flange 36 to thereby make the bearing an integral part of the finished product.

In the event that a bearing member 32 is not positioned on a core pin 60 a mold band the closing of the mold will leave a gap between annular face 74 and the lower extremity of groove 66 whereby injection of the material to form the pulley wheel 20 will flow through the groove or runner 66 into the recess face 72 in core pin 70 forming the disk 40 and its strut 42 which are the material filling the recess 72 and groove 66 respectively, thus a fail-safe article of manufacture is provided which insures that each and every usable item will have its necessary elements. In the absence of one of these elements, in the present case bearing 32, a means is provided for preventing usage of the incomplete article which can then be cast aside as scrap and which additionally eliminates the necessity for total inspection.

A second embodiment of the present invention can be formed in a mold of the type shown in partial section in FIG. 11. The mold 80 has a pair of movable plates 82-84 provided on their face with complimentary cavities for forming the pulley wheel, only the hub and web being shown. Each of the plates is provided with a core pin 88-90 of substantially equal lengths and extending into the cavity for forming the hub 22. Adjacent one end of each core pin is an annular shoulder 92-94 which are similar in function to the annular shoulder 62 and annular face 74 in the previously described embodiment. Each of the end faces of the opposing core pin are provided with a dished recess 96 and at least one or more laterally extending grooves or runners 98. For ease in tooling the core pins 88-99 can be identical by having a dished recess 96 with opposed groove 98 with core pin 88 rotated ninety degrees from the positioning of core pin 90 for purposes best set forth hereinafter. The operation of this mold is substantially identical to the previous one described in that a bearing 32, shown in phantom, is positioned over one of the core pins, the mold 80 is closed and the bearing 32 brought to bear against the opposed annular shoulder 92-94 to seal off the core pins 88-90.

In the absence of a bearing member 32 the material for the wheel will flow into the grooves 98 and fill the cavities 96 to form an obstruction, not shown, which would be the equivalent of disk 40 and strut 42.

It will be apparent to those skilled in the art that there are other applications to this concept, for example, where it is desirable to insert mold the bearing member within a prefinished pulley wheel an obstruction of the type formed by the mold shown in FIG. 11, with the strut portion being very thin, could be removed when the semifinished wheel is moved over a core pin with the obstruction serving as a warning means for those devices not having the insert bearing molded therein. Other applications of the concept embodied in this invention could include the insert molding of a rim or teeth on a wheel-like device and provide a plurality of radially extending protuberances in the absence of the secondary element. It is our intent to be only limited by the appended claims.

I claim:

1. An article of manufacture adapted to warn the user of its incompleteness, including a body normally having a through bore adapted to mount said body on a shaft, means obstructing said bore to prevent its usage on said shaft, the presence or absence of said means being determined by the absence or presence, respectively, of a secondary member or operation on said body.

2. A device of the type claimed in claim 1 wherein said means obstructing said bore is located adjacent one end of said bore.

3. A device of the type claimed in claim 2 wherein said obstructive means includes a disc-like portion substantially covering said bore and supported by web means integral with said portion and the wall of said bore.

4. A device of the type claimed in claim 1 wherein said means obstructing said bore is located intermediate the axial extremities of said bore.

* * * * *